Sept. 12, 1939.　　　　E. M. FEIGHAN　　　　2,172,371
CHECK VALVE MECHANISM
Filed July 11, 1936　　　2 Sheets-Sheet 1

INVENTOR.
EDWARD M. FEIGHAN
BY Bates, Golrick, & Teare
ATTORNEYS

Sept. 12, 1939.   E. M. FEIGHAN   2,172,371
CHECK VALVE MECHANISM
Filed July 11, 1936   2 Sheets-Sheet 2

INVENTOR.
EDWARD M. FEIGHAN
BY Bates, Golrick, & Teare
ATTORNEYS

Patented Sept. 12, 1939

2,172,371

UNITED STATES PATENT OFFICE 2,172,371

CHECK VALVE MECHANISM

Edward M. Feighan, Euclid, Ohio, assignor to The Josam Manufacturing Company, Cleveland, Ohio, a corporation of Delaware Application July 11, 1936, Serial No. 90,175

2 Claims. (Cl. 251—123)

Figure 1:
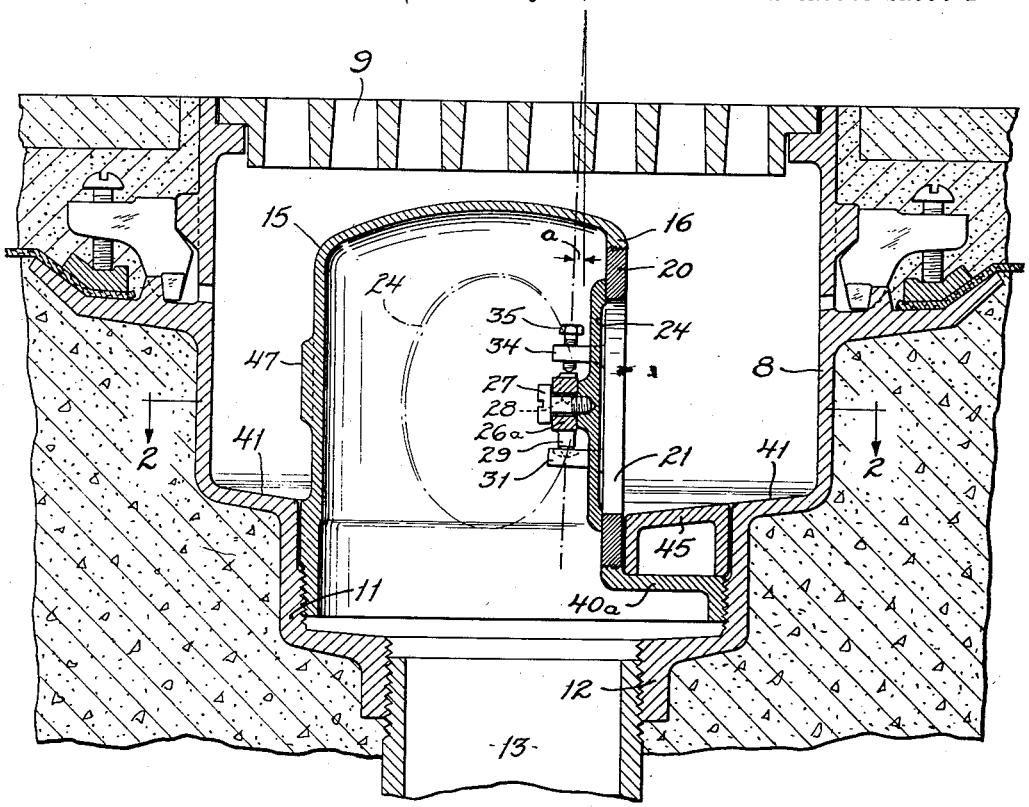
Figure 2:
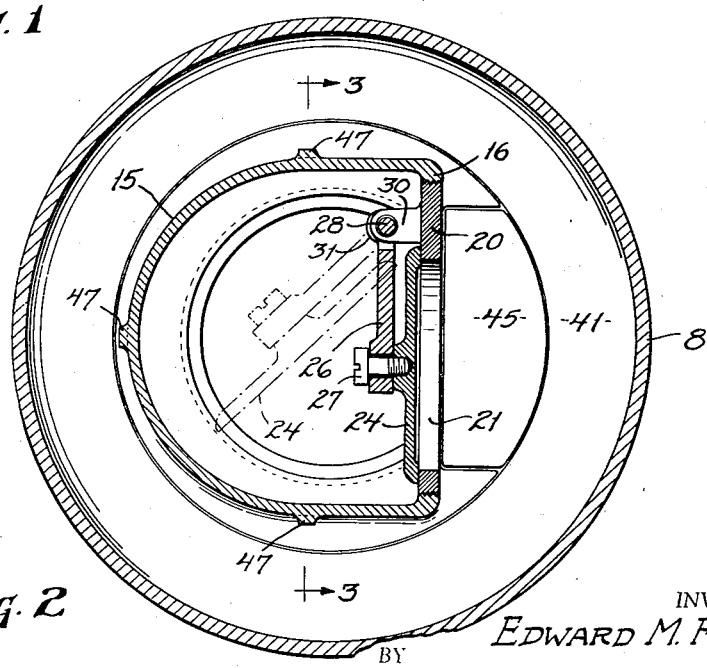
Figure 3:
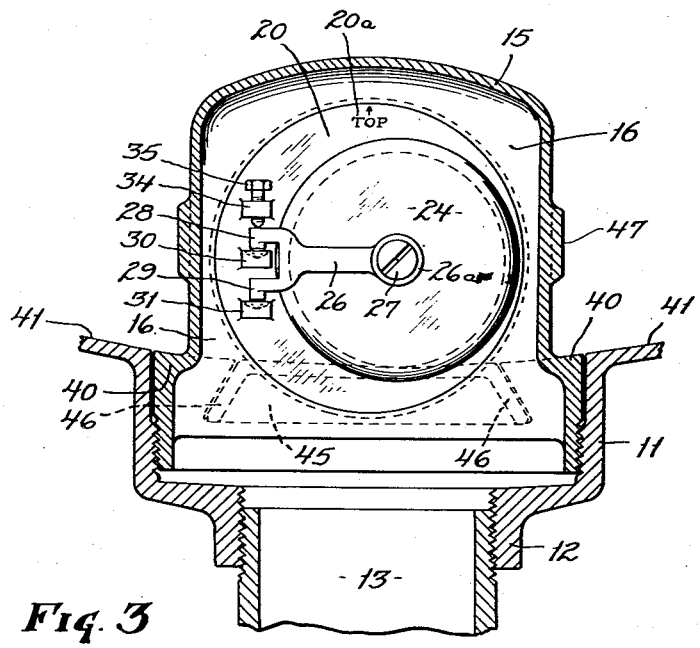
Figure 4:
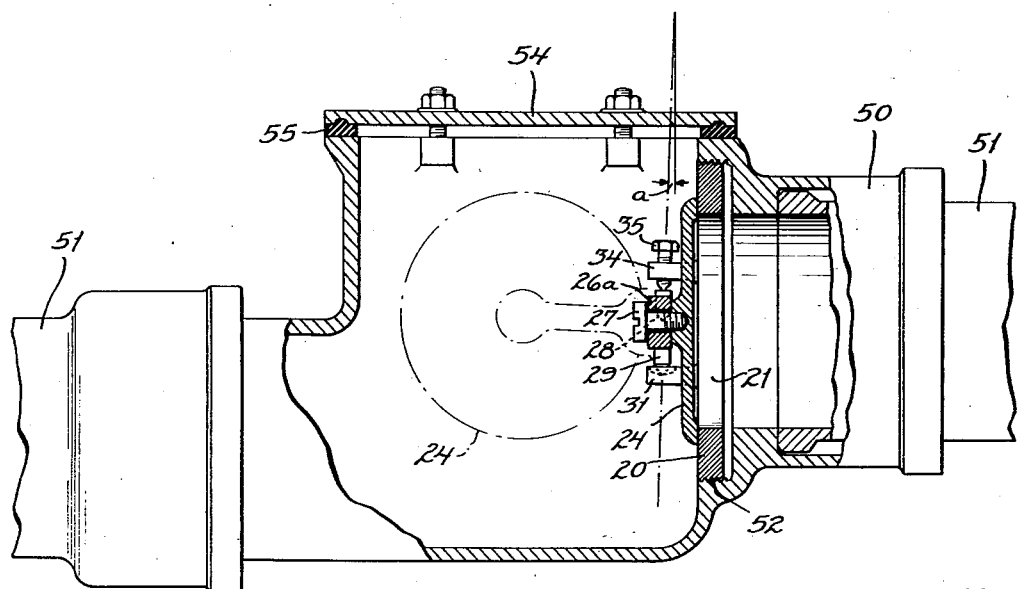

This invention is concerned with check valves of the pivoted or swing-check type, and has for its general object the provision of a check-valve mechanism which, under normal conditions, will remain in a closed or shut condition, and will be of such simple construction and operation as to be adaptable to a variety of plumbing fittings, wherein it is desired to prevent a back-flow in the plumbing line.

A further object of my invention is to provide a check-valve mechanism of the swing-check member type which will be dependable and sensitive in its operation.
A further object of my invention is the provision of a combined floor drain and check-valve construction, wherein the back flow of drainage water is prevented dulring emergency conditions and which will function to shut off the escape of gases from the drain line during normal inoperative periods.
A still further object of my invention is to provide a combined surface drain and check valve mechanism of the catch-basin type, which will function to completely drain all of the water or liquid from the basin and thus prevent the formation of small cess pools within the mechanism.
Other objects of my invention will be summarized in the claims.
In the drawings, in Fig. 1 I show my invention incorporated in a floor drain, which is illustrated as being embedded in the floor structure and connected to a plumbing line, this figure being in cross-section. Fig. 2 is a cross-sectional view of the floor drain illustrated in Fig. 1, the section being taken substantially along the plane indicated by the line 2—2 in Fig. 1; Fig. 3 is a vertical cross-sectional view of the check mechanism of the fitting illustrated in Figs. 1 and 2, this section being taken substantially along the plane indicated by the line 3—3 in Fig. 2; and Fig. 4 is a side elevational view of the adaptation of my invention to a sewage line check-valve mechanism.
Heretofore there have been two general types of check valves in prevailing use, namely, the ball or float type and the swinging gate type, the check member of the latter being mounted to swing about a horizontally disposed pivot axis above the opening which the check member functions to close. I propose to construct a check-valve mechanism wherein the check member, under normal inoperative conditions, will remain in a closed position, but which will be sensitive to any flow conditions in the plumbing line in which the check valve mechanism is incorporated. For the purposes of illustration I have shown this mechanism in the drawings of this application as being incorporated in a floor drain and also in a sewer line.
Referring to the drawings and Fig. 1, a floor drain body member with a grid opening is generally indicated by the reference numeral 8, and is illustrated as being embedded in the foundation of material forming the floor structure. The fitting 8 is shaped to provide a catch-basin chamber below the floor level, the top of the fitting being closed by a grid member 9, the top surface of which is level with the floor surface or surface being drained. The lower part of the body member 8 is provided with a downwardly extending portion 11 of smaller diameter than the catch-basin portion of the body member, for the purpose of attachment to a check mechanism, and the body portion 11 is provided with an internally threaded flange portion 12 adapted to be connected to the drain line 13. The drain body portion 11 is internally threaded to engage threads formed on the bottom of a dome structure at 15, comprising part of the check mechanism. The dome member 15 is of greater diametrical dimension in the lower part thereof than the top portion and is provided with a flat, vertically extending wall 16, on one side thereof, for purposes to be hereinafter set forth.
The check-valve mechanism comprises a valve seat member 20, in threaded engagement with an opening formed in the vertical wall 16 of the dome member 15, and is provided with a valve opening 21, (as illustrated in Figs. 1 and 2). The opening 21 is eccentrically disposed relative to the center of the seat member 20, as illustrated in Fig. 3, and is closed by a swing valve member in the form of a disk 24. The valve member 24 is loosely and pivotally supported by a substantially, horizontally swingable arm 26. The disk 24 and arm 26 are connected by a screw member 27, threaded centrally into the disk. The screw 27 extends through an opening formed in the end 26a of the arm, and the opening is of such diameter, relative to the size of the shank of the screw 27, so as to afford a loose connection between the arm 26 and the valve member 24, whereby the latter may adjust itself to the proper seating position against the face of the valve seat ring 20. The opposite end of the valve arm 26 is fork-shaped, to provide two pivot-point bearing portions 28 and 29, having downwardly extending bearing points, which pivotally rest in bearing sockets formed in the lug members 30 and 31, respectively. The latter members may be mounted upon or be integrally formed upon the valve seat member 20, as shown in Figs. 2 and 3. A third lug 34 is provided upon the valve seat member 20, in substantially vertical alignment with the lugs 30 and 31, and is threaded to receive a bearing pin 35, which serves to maintain the pivot points of the valve arm 26 in operative position in the bearing sockets formed in the lugs 30 and 31. A center line, passing through the sockets formed in the lugs 30 and 31, and the bearing points formed on the portions 28 and 29 of the valve arm 26, comprises the swinging axis of the valve arm 26. I propose to have this axis slightly displaced from the true vertical position to the extent of the angle $a$, indicated by broken lines in Figs. 1 and 4. The axis is slightly tilted, relative to the true vertical position toward the top of the valve seat member 20, whereby gravitational influence upon the weight of the arm 26 and the swing valve member 24, will cause the valve member 24 to remain in closed position when the drain is inactive and be swung to a normally closed position relative to the valve seat 20, when flow pressure ceases. The sensitiveness of this swinging arrangement can be increased or decreased, as desired, by effecting a screw adjustment between the valve seat member 20 and the body of the dome member 15. Any displacement of the axis from its vertical position will either increase or decrease this influence.

If desired, the valve seat member may have a marking to indicate the top position of the valve seat ring, whereby visible means are afforded during the assembly of the valve mechanism to determine what additional angular displacement of the valve swing member axis from the vertical is necessary to be made when the valve seat ring 20 is being adjusted relative to the dome member 15.

In Figs. 1, 2 and 3, I have illustrated a practical commercial form of floor drain. To facilitate its economical manufacture and assembly, as well as to provide a drain body having a catch-basin, the lowermost part of which will be assured of drainage to prevent the formation of small cess pools, I have arranged a threaded connection between the dome member 15 and the drain body 8 in such a manner that the threaded flange portion 40 of the dome member 15 will be disposed in surface-alignment with the bottom portion 41 of the drain body 8, and the lowermost part of the valve opening 21 of the valve member 20 will be level with or below the bottom of the catch-basin. In order to economically accomplish this purpose and to obtain an easy assembly of the parts comprising the valve mechanism, including the dome 15, as well as a tight assembly of the dome to the drain body, I have formed a depressed portion 40a in the lower part of the dome structure, to permit ready machining of the threaded opening formed in the wall 16 of the dome structure and also to permit easy insertion of the valve seat ring 20 therein. This assembly is made before the dome member 15 is inserted within the drain body. To also obtain a flush full-drainage condition of the bottom of the basin I provide an insert member 45, the top surface of which is a continuation of the bottom surface of the catch-basin as shown in Fig. 1, and is flush with the lowermost part of the valve opening 21. As shown in Fig. 3, the insert member 45 has tapering side walls 46 which fit into a slot formed in the lower part of the dome member 15, having complementary walls, so that when the dome assembly is screw-attached to the drain body 8, as illustrated in Fig. 1, the member 45 cannot be removed. The dome is provided with ribs 47 to afford suitable grip for a wrench.

In Fig. 4 I have illustrated the adaptation of my valve-check mechanism to a back-water sewer trap, the trap having a body 50 provided with suitable branches for connection to the sewer line 51, and the same reference numerals are used to indicate members and portions thereof comprising the valve mechanism as used in the form of plumbing fittings shown in Fig. 1. The valve seat ring 20 is in threaded engagement with an internal thread 52 formed within the body of the trap, the trap being of the step-down type, whereby the swinging valve member will be disposed normally above any residual sewage water remaining in the sewer line 51. The top is provided with a suitable opening for assembly and cleaning purposes, and this opening may be closed in a conventional manner by the use of a removable cover plate 54 and gasket 55.

I claim:

1. In a check valve, an upright open-bottom body member provided with a lateral opening, an annular seat member threadedly mounted in said opening with its seating face in a vertical plane and with its port eccentrically formed therethrough, a valve disc in said body member cooperating with said seating face, a supporting arm on said disc pivotally mounted on the seat member at one side of said port for swinging movement in a plane slightly inclined from the horizontal, the axis of the arm pivot being slightly inclined inwardly with respect to the vertical plane of the seating face whereby the weight of the swinging disc tends to maintain the disc seated.

2. In a check valve, a body member provided with means for connecting the same to a drain line, and provided with a lateral opening, an annular seat member adjustably mounted in said opening with the seating face thereof disposed in a vertical plane and having a port eccentrically formed therethrough, a valve disc disposed within the body member to cooperate with said seating face, to close the lateral opening, said disc being supported by a swingable arm pivotally mounted on the seat member at one side of said port to permit swinging movement of the arm in a plane slightly inclined from the horizontal, and the axis of the arm pivot being arranged to be slightly inclined toward the vertical plane of the seating face, whereby the weight of the disc tends to maintain the disc seated.

EDWARD M. FEIGHAN.